United States Patent
Li et al.

(10) Patent No.: US 10,599,914 B2
(45) Date of Patent: Mar. 24, 2020

(54) METHOD AND APPARATUS FOR HUMAN FACE IMAGE PROCESSING (71) Applicant: Baidu Online Network Technology (Beijing) Co., Ltd., Beijing (CN)

(72) Inventors: Guang Li, Beijing (CN); Jiawei Gu, Beijing (CN); Shasha Yan, Beijing (CN); Jianping Hao, Beijing (CN); Jiabin He, Beijing (CN); Li Xu, Beijing (CN); Jingtuo Liu, Beijing (CN); Fuguo Zhu, Beijing (CN); Zhengping Wei, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 15/533,939

(22) PCT Filed: Nov. 27, 2015

(86) PCT No.: PCT/CN2015/095755
§ 371 (c)(1),
(2) Date: Jun. 7, 2017

(87) PCT Pub. No.: WO2017/035966
PCT Pub. Date: Mar. 9, 2017

(65) Prior Publication Data
US 2018/0204052 A1    Jul. 19, 2018

(30) Foreign Application Priority Data

Aug. 28, 2015  (CN) .......................... 2015 1 0543688

(51) Int. Cl.
*G06K 9/00*    (2006.01)
*G06T 7/11*    (2017.01)
(Continued)

(52) U.S. Cl.
CPC ..... *G06K 9/00281* (2013.01); *G06K 9/00248* (2013.01); *G06K 9/00302* (2013.01);
(Continued)

(58) Field of Classification Search
CPC ........... G06K 9/00281; G06K 9/00302; G06K 9/00248; G06K 2209/21
See application file for complete search history.

(56) References Cited

U.S. PATENT DOCUMENTS

2009/0220149 A1*  9/2009  Menadeva ......... G06K 9/00228
                                                        382/165
2014/0085293 A1*  3/2014  Konoplev ............... A63F 13/12
                                                        345/419
2015/0035825 A1   2/2015  Zhou et al.

FOREIGN PATENT DOCUMENTS

CN        1447955 A    10/2003
CN      101179665 A     5/2008
(Continued)

OTHER PUBLICATIONS

International Search Report corresponding to International Patent Application No. PCT/CN2015/095755, State Intellectual Property Office of the P.R. China, dated Apr. 29, 2016; (2 pages)

*Primary Examiner* — Ruiping Li
(74) *Attorney, Agent, or Firm* — Nixon Peabody LLP (57) ABSTRACT

The present disclosure discloses a method and apparatus for human face image processing. A specific embodiment of the method comprises: locating facial feature points in a human face image, extracting an image of a human face region according to a range defined by the facial feature points, transforming a facial image of the source image according to a face shape of the target image, transforming the facial image of the source image according to a complexion distribution of a facial region of the target image, and obtaining a new human face by combining the facial image
(Continued)

of the source image and a facial image of the target image. The embodiment achieves a facial image processing with higher similarity to the user in the image, of simple steps, small calculation and high real-time performance.

9 Claims, 4 Drawing Sheets

(51) Int. Cl.
*G06T 3/00* (2006.01)
*G06K 9/62* (2006.01)

(52) U.S. Cl.
CPC .......... *G06K 9/6206* (2013.01); *G06T 3/0093* (2013.01); *G06T 7/11* (2017.01); *G06K 2209/21* (2013.01)

(56) References Cited

FOREIGN PATENT DOCUMENTS

| | | | |
|---|---|---|---|
| CN | 101299267 A | 11/2008 |
| CN | 101556699 A | 10/2009 |
| CN | 101770649 A | 7/2010 |
| CN | 102254336 A | 11/2011 |
| CN | 103268623 A | 8/2013 |

* cited by examiner

METHOD AND APPARATUS FOR HUMAN FACE IMAGE PROCESSING

CROSS-REFERENCE TO RELATED APPLICATION

This application is a U.S. National Stage of International Application No. PCT/CN2015/095755, filed Nov. 27, 2015, which is related to and claims priority from Chinese Application No. 201510543688.2, filed on Aug. 28, 2015, the entire disclosures of which are hereby incorporated by reference in their entireties.

TECHNICAL FIELD

The present disclosure relates to the field of image processing, specifically to the field of image fusion processing, and more specifically to a method and apparatus for human face image processing.

BACKGROUND

With the progressive development of smart electronic products, applications for mobile phones or tablet PCs and computers become indispensable in one's lives. In a networked environment, users often want to use their own artistically or entertainingly processed portrait. In conventional technology, face-joining or face changing applications are very common, but the image processing is achieved based on the picture, and the produced cartooned image shares a low similarity with the user in the picture. In addition, the obtained cartooned image processed by the human face stylization application is not artistic enough. The processing is fairly complex and a real-time display is not possible.

SUMMARY

The present disclosure provides a method and apparatus for human face image processing, in order to solve the technical problem mentioned in the foregoing Background section.

In one aspect, the present disclosure provides a method for human face image processing, comprising: locating facial feature points in a human face image; extracting an image of a human face region according to a range defined by the facial feature points; setting a user image as a source image and a reference object image as a target image; transforming a facial image of the source image according to a face shape of the target image; transforming the facial image of the source image according to a complexion distribution of a facial region of the target image; obtaining a new human face by combining the facial image of the source image and a facial image of the target image.

In some embodiments, the facial feature points are selected with reference to the following two: a contour of a face and locations of facial organs, the facial feature points are represented by position information of coordinate points.

In some embodiments, the complexion distribution information is represented by a RGB value corresponding to each point in the human face region.

In some embodiments, the transforming operation is performed according to the range defined by the facial feature points of the target image, or according to the range defined by the facial feature points of the source image.

In some embodiments, the number of the facial feature points selected is related to the image processing effect.

In another aspect, the present disclosure provides an apparatus for human face image processing, comprising: a location module configured to locate facial feature points in a human face image; an image extraction module configured to extract an image of a human face region, set a user image as a source image and a reference object image as a target image, according to a range defined by the facial feature points; a face shape transformation module configured to transform a facial image of the source image according to a face shape of the target image; a complexion transformation module configured to transform the facial image of the source image according to a complexion distribution of a facial region of the target image; an image fusion module configured to obtain a new human face by combining the facial image of the source image and a facial image of the target image.

In some embodiments, the image extraction module is further configured to select the facial feature points with reference to the following two: a contour of a face and locations of the facial organs, and represent the facial feature points by position information of coordinate points.

In some embodiments, the complexion distribution information is represented by a RGB value corresponding to each point in the human face region.

In some embodiments, the transformation module is further configured to perform the transforming operation according to the range defined by the facial feature points of the target image, or according to the range defined by the facial feature points of the source image.

In some embodiments, the number of the facial feature points selected is related to the image processing effect.

The method and apparatus for human face image processing provided by the present disclosure, by locating a facial feature points in a human face image, acquiring coordinates of the human face feature points, transforming a source image according to a target human face image based on the face shape, locations of facial organs and user expression, and fuse the complexion distribution information of the target image to the human face of the source image and obtain a transformed human face, it achieves a facial image processing with higher similarity to the user in the image, of simple steps, small calculation and high real-time performance.

BRIEF DESCRIPTION OF THE DRAWINGS

Other features, objectives and advantages of the present disclosure will become more apparent upon reading the detailed description to non-limiting embodiments with reference to the accompanying drawings, wherein.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant invention, rather than limiting the invention.

In addition, it should be noted that, for the ease of description, only the parts related to the relevant invention are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
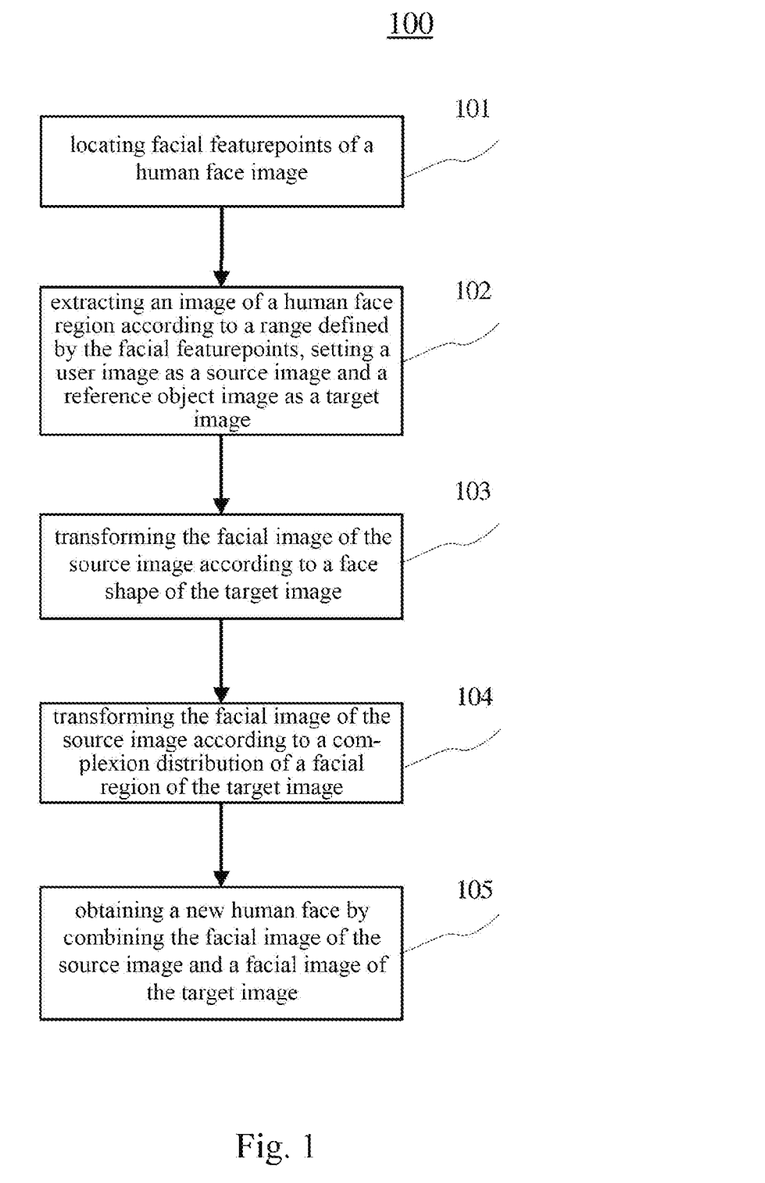
FIG. 1 is a flowchart of an embodiment of a method for human face image processing according to the present disclosure.

Referring to FIG. 1, a flowchart 100 of an embodiment of a method for human face image processing is shown. The flowchart 100 of the method for human face image processing described in the present embodiment includes the following steps:

Step 101, locating facial feature points in a human face image.

In the present embodiment, when it is necessary to identify the human face region in the facial image, key points of each facial feature points may be marked on the facial image. The marking may be manual, or various marking tools may be applied. After the facial image is marked with the key points of each facial feature points, the location of the key points of each facial feature points on the facial image may be determined.

Figure 2:
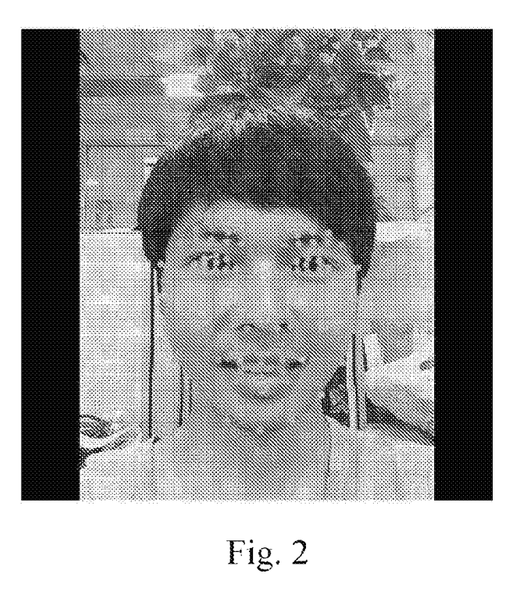
FIG. 2 is a schematic diagram of the displayed effect of locating the facial feature points according to the present disclosure.

For example, referring to FIG. 2, FIG. 2 is a schematic diagram of the displayed effect of locating the facial feature points, wherein facial feature points include, but are not limited to, eyes, nose, mouth, chin, etc. Here, eyes include the left eye and the right eye, and nose may be the wing of the nose or the tip of the nose. The wing of the nose includes the left wing of the nose and the right wing of the nose. Specifically, facial feature points may also include cheek, jaw, etc. Cheek includes the left cheek and the right cheek, and jaw includes the left jaw and the right jaw. It may be understood that the facial feature points may also be the remaining features of the face, which are not limited herein.

In some alternative implementations of the present embodiment, the choice of the number of facial feature points is diversified, and the number of commonly used feature points is 42, 72, 79 or even more. The more feature points are selected, the better the face-pasting effect of the human face is. In the present disclosure, it is concluded from repeated experiments that applying 72 feature points can get an excellent user experience, and the timeliness of implementing the transforming operation is also taken care of.

Step 102, extracting an image of a human face region according to a range defined by the facial feature points.

In the present embodiment, the position information of the facial screenshot region is defined by the facial feature points so that the entire human face region can be segmented and the segmented portion is used in the facial information fusion processing, such as, the expression transfer processing, the complexion transformation processing, face shape and features transformation processing.

Figure 3:
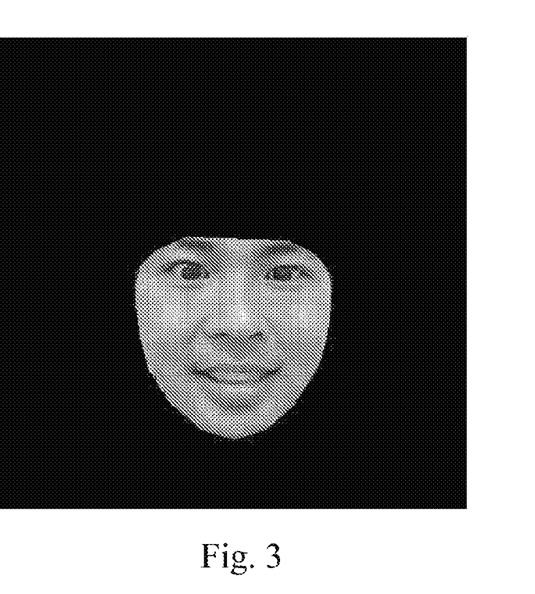
FIG. 3 is a schematic diagram of the displayed effect of segmenting the facial region according to the present disclosure.

For example, referring to FIG. 3, is a schematic diagram of the displayed effect of segmenting the facial region, wherein the obtained segmented facial information is facial contour information defined by the facial feature points. The above limitation reduces the range that requires a fusion processing, optimizes the time for performing the face-pasting operation, so that the operation is more targeted and more accurate.

In the present embodiment, the facial feature points in the facial image is represented by the key points of the facial feature points, so that the locating of the facial feature points in the facial image is simpler and more accurate. Since the position of the key point of the facial feature points is very accurate, such as to the coordinates of the plane coordinate system on the screen, errors of facial recognition due to inaccurate locating of the facial feature points are reduced.

Step 103, transforming the facial image of the source image according to a face shape of the target image.

In the present embodiment, the face shape of the target image includes the face shape and characteristics of the face features, and by providing a sufficient number of feature points, it is possible to obtain accurate position information of the features on the face. For example, the feature point 50-60 is used to indicate the shape of the mouth. When the mouth action is smiling, the position coordinates of the plurality of feature points marking the mouth are moved upwards and extended to both the left side and the right side. When the mouth action is open, the plurality of feature points marking the positions of the upper lip and the lower lip extend in the vertical direction. Similarly, marking the eyes with feature points can also denote open and close of the eyes, and the location information captured through real-time update can denote blink action. The setting of the feature point position may be designated according to whether the positions of the features are easy to change. For the feature whose position is easy to change, for example, the eyes and the mouth may be defined by more feature points, so that the action obtained is smoother. But for the feature whose position is not easy to change, for example, the nose, a relatively small number of feature points may be used to define. In this way, the resource allocation is optimized and the storage space is reduced.

In some alternative implementations of the present embodiment, the acquisition of facial expression information is also critical to the face-pasting operation. Here, expression information and facial feature points of the features are closely related, part of the actions of the features can be understood as expression information, but the expression information is more abundant and diverse than the characteristics of the features. For example, a smile action will involve movement of the mouth, and also related to changes in facial contour, eyes and eyebrows. The capture of characteristics of the features may only concern a single organ, but the capture of expression information is achieved by monitoring the facial feature points values of the entire face.

In some alternative implementations of the present embodiment, the transforming operation includes implemented by referring to the range defined by the facial feature points of the target image, or implemented by referring to the range defined by the facial feature points of the source image. Since the essence of the transforming operation is a covering operation, that is covering the feature value of an image with the feature value of another image, the implementation object of the operation may be a target image or a source image, and the obtained composite image is not the same. The image taken as basis reserves more feature values and is more likely to be identified.

In some alternative implementations of the present embodiment, the source image is the human face image of the user himself, and the target image is an image of a celebrity or a cartoon character as a transformation template stored in the terminal. When the transformation function is turned on, the terminal automatically fuse the captured human face image with the image of the celebrity or the cartoon character stored in the terminal, and display the changes in the expression of the user in real time.

Figure 4A:
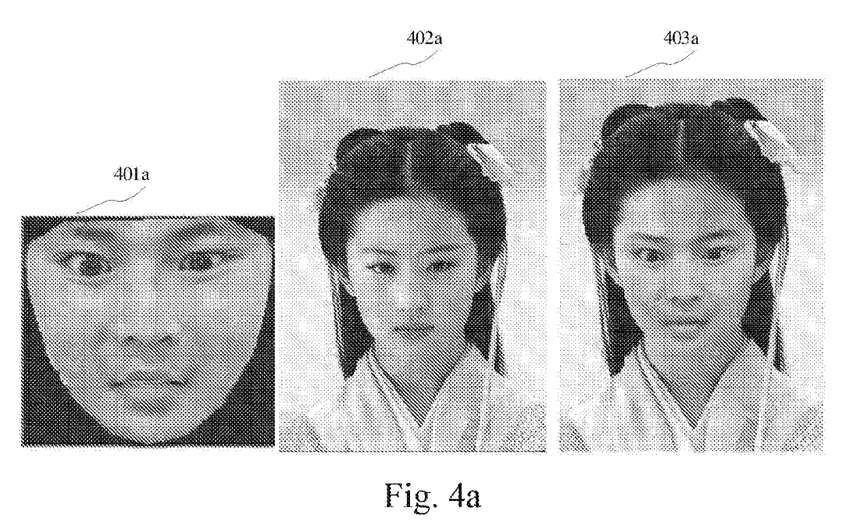
FIG. 4a is a schematic diagram showing the effect of operating an embodiment to a facial image transformation.
Figure 4B:
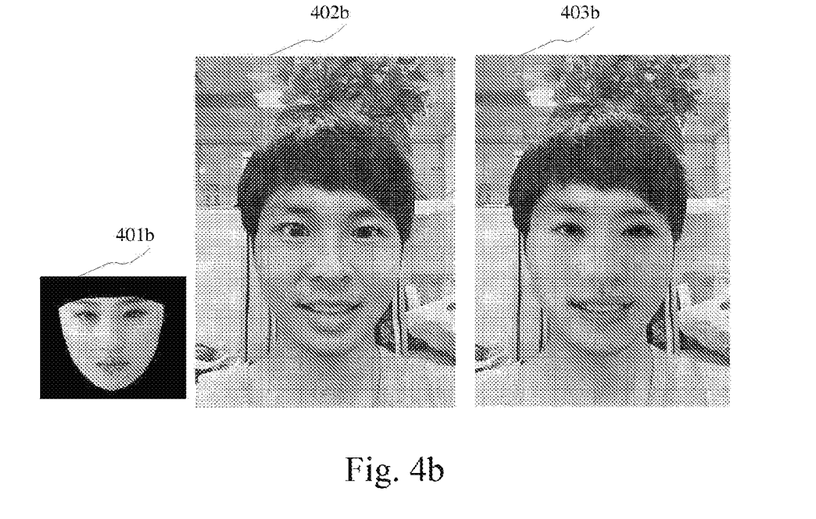
FIG. 4b is a schematic diagram showing the effect of operating another embodiment to a facial image transformation.

For example, referring to FIG. 4, FIG. 4a is a schematic diagram showing the effect of operating an embodiment to a facial image transformation, and FIG. 4b is a schematic diagram showing the effect of operating another embodiment to a facial image transformation. Comparing the above two schematic diagrams, different composite effect diagrams 403a and 403b can be obtained.

In the present embodiment, when a composite picture is generated on the basis of a face picture, different synthesis modes are covered and replaced so that the user may obtain a series of expression pictures expressing different emotions at almost the same time, allowing the user to have more choices, which further enhances the user experience.

Step 104, transforming the facial image of the source image according to a complexion distribution of a facial region of the target image.

In the present embodiment, the complexion distribution information is represented with a RGB value, and the transformation of the image is realized employing the weighted stacking method. For example: alpha*src_rgb+(1−alpha)*dst_rgb here, alpha is the transparency set by the human face pixel value (src_rgb) of the source image; and (1−alpha) is the transparency set by the human face pixel value (dst_rgb) of the target image.

The execution of the weighted stacking operation of the above complexion distribution information is implemented in the facial contour region defined by the feature points, that is, the position of each human face organ is determined by the position information of the feature points, such as, the position of the eyes, the position of the nose and the position of the mouth. Then a superposition calculation is performed on the complexion distribution information of each part, so that the original image information can be accurately transmitted to the image taken as basis.

Step 105, obtaining a new human face by combining the facial image of the source image and a facial image of the target image.

In the present embodiment, by playing a newly generated human face image at a frequency of 15-25 frames per second, a set of videos displaying smoothly and in real-time of the user's facial expression changes can be obtained, thus achieving a high-level entertaining processing of the personal facial feature points, and improving the user experience.

In some alternative implementations of the present embodiment, in order to denote the positions of the facial feature points more accurately, key points of facial feature points can be used to represent each of the facial feature points. Here, the key point of the facial feature points may be any one point in the facial feature points, such as for the eye, the eyeball central point or the canthus, may be used as the key point of the eye. The position of the key point of the facial feature points refers to the position where the key point representing the facial feature points is located. In the plane coordinate system of the screen, the position of the key point of the facial feature points may be represented by a coordinate point (x, y). Here, the coordinate point (x, y) is the coordinate point of the key point of the facial feature points in the plane coordinate system of the facial image.

Figure 5:
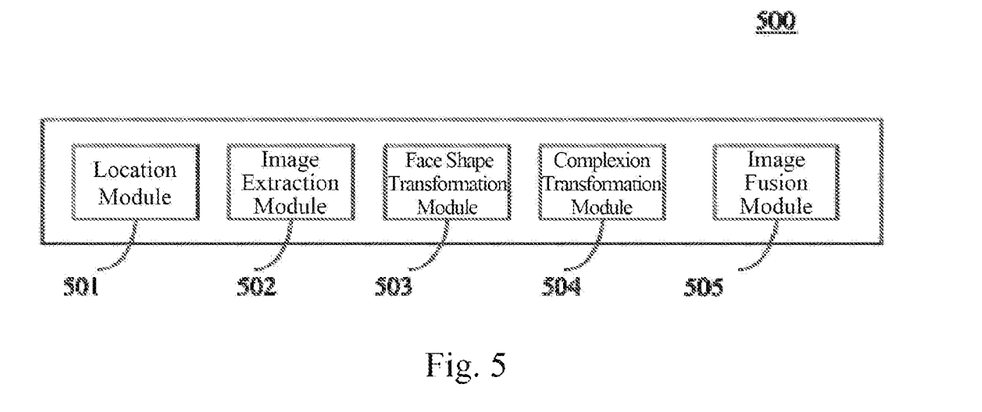
FIG. 5 is a schematic diagram of an embodiment of a human face image processing apparatus according to the present disclosure.

Referring to FIG. 5, a schematic diagram 500 of an embodiment of a human face image processing apparatus according to the present disclosure is shown. The apparatus for human face image processing described in the present embodiment includes a location module 501, an image extraction module 502, a face shape transformation module 503, a complexion transformation module 504, and an image fusion module 505.

In the present embodiment, the location module 501 is configured to locate facial feature points in a human face image. The image extraction module 502 is configured to extract an image of a human face region, set a user image as a source image and a reference object image as a target image, according to a range defined by the facial feature points. The face shape transformation module 503 is configured to transform a facial image of the source image according to a face shape of the target image. The complexion transformation module 504 is configured to transform the facial image of the source image according to a complexion distribution of a facial region of the target image. The image fusion module 505 is configured to obtain a new human face by combining the facial image of the source image and a facial image of the target image. The human face image processing apparatus may be applied to mobile devices, such as smart phones, tablet PCs, etc., and may also be applied to computers, etc. It may be running in these devices within a software unit, a hardware unit or a hardware and software combining unit, or as an independent accessory integrated into these devices or running in the application system of these devices.

In some alternative implementations of the present embodiment, in order to denote the positions of the facial feature points more accurately, key points of facial feature points can be used to represent each of the facial feature points. Here, the key point of the facial feature points may be any one point in the facial feature points, such as for the eye, the eyeball central point or the canthus may be used as the key point of the eye. The position of the key point of the facial feature points refers to the position where the key point representing the facial feature points is located. In the plane coordinate system of the screen, the position of the key point of the facial feature points may be represented by a coordinate point (x, y). Here, the coordinate point (x, y) is the coordinate point of the key point of the facial feature points in the plane coordinate system of the facial image.

In some alternative implementations of the present embodiment, the transforming operation includes implemented by referring to the range defined by the facial feature points of the target image, or implemented by referring to the range defined by the facial feature points of the source image. Since the essence of the transforming operation is a covering operation, that is covering the feature value of an image with the feature value of another image, the object of the operation may be a target image or a source image, and the obtained composite image is not the same. The image taken as basis reserves more feature values and is more likely to be identified.

It is to be noted that the modules included in the above apparatus are only divided according to their functional logic, but are not limited to the above division, as long as the corresponding function can be achieved. In addition, the specific name of each function module is only for the convenience of distinguishing and is not intended to limit the protection scope of the disclosure.

It may be understood by those skill in the art that the realization of all or a portion of the steps in the method of the embodiments described above may be accomplished by means of a program by instructing related hardware. The program may be stored in a computer readable storage medium, such as ROM/RAM, disk, CD, etc.

Figure 6:
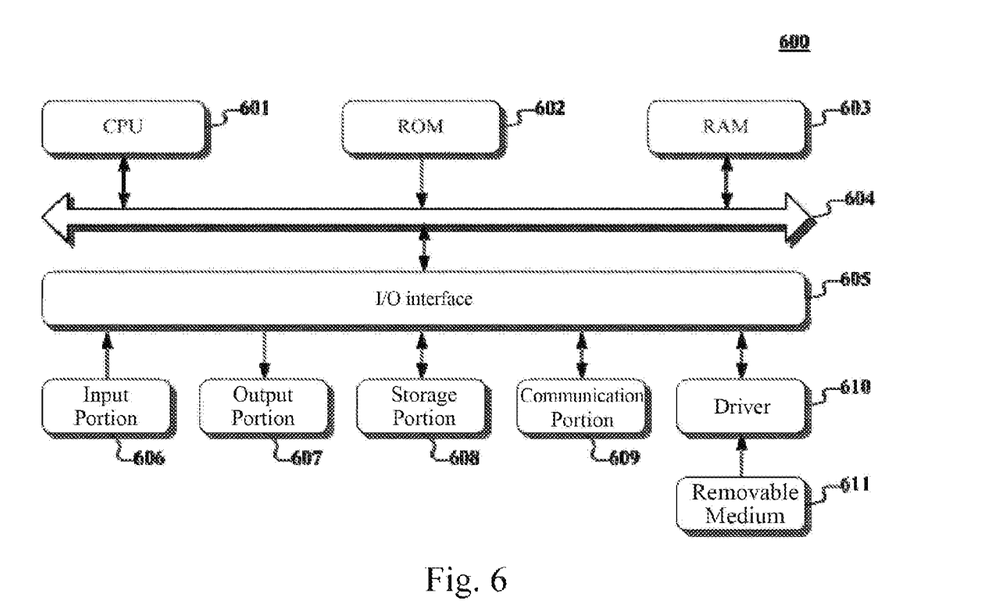
FIG. 6 is a schematic structural diagram of a computer system adapted to implement a terminal device or a server of the embodiments of the present disclosure.

Referring to FIG. 6, a schematic structural diagram of a computer system 600 adapted to implement a terminal device or a server of the embodiments of the present disclosure is shown.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611.

In another aspect, the flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A method for human face image processing, comprising:
    locating facial feature points in a human face image;
    extracting an image of a human face region for facial information fusion processing according to a range defined by the facial feature points, the facial information fusion processing comprising expression transfer processing;
    setting a user image as a source image and a reference object image as a target image;
    transforming a facial image of the source image according to a face shape and characteristics of facial feature points of the target image;
    processing the transformed facial image of the source image according to expression information and complexion distribution information of a facial region of the target image, the complexion distribution information being represented by an RGB value corresponding to each point in the facial region of the target image; and
    obtaining a new human face by combining the processed facial image of the source image and the facial image of the target image to display changes in expression of the user in real time.

2. The method according to claim 1, wherein the facial feature points are obtained with reference to following two: a contour of a face and locations of facial organs, the facial feature points are represented by position information of coordinate points.

3. The method according to claim 1, wherein the transforming operation is performed according to the range defined by the facial feature points of the target image, or according to the range defined by the facial feature points of the source image.

4. The method according to claim 1, wherein a number of the facial feature points selected is related to an image processing effect.

5. A device for human face image processing, comprising:
    a processor; and
    a storage,
    wherein the storage stores computer-readable instructions that can be executed by the processor, and the processor performs operations when the computer-readable instructions are executed, the operations comprising:
    locating facial feature points in a human face image;
    extracting an image of a human face region for facial information fusion processing according to a range defined by the facial feature points, the facial information fusion processing comprising expression transfer processing;

setting a user image as a source image and a reference object image as a target image;

transforming a facial image of the source image according to a face shape and characteristics of facial feature points of the target image;

processing the transformed facial image of the source image according to expression information and complexion distribution information of a facial region of the target image, the complexion distribution information being represented by an RGB value corresponding to each point in the facial region of the target image; and obtaining a new human face by combining the processed facial image of the source image and the facial image of the target image to display changes in expression of the user in real time.

6. A non-transitory computer storage medium, wherein the non-transitory computer storage medium stores computer-readable instructions that can be executed by a processor, and the processor executes the method of claim 1 when the computer-readable instructions are executed by the processor.

7. The device according to claim 5, wherein the facial feature points are obtained with reference to following two: a contour of a face and locations of facial organs, the facial feature points are represented by position information of coordinate points.

8. The device according to claim 5, wherein the transforming operation is performed according to the range defined by the facial feature points of the target image, or according to the range defined by the facial feature points of the source image.

9. The device according to claim 5, wherein a number of the facial feature points selected is related to an image processing effect.

* * * * *